United States Patent [19]

Csanady, Jr.

[11] 4,112,975

[45] Sep. 12, 1978

[54] VALVING APPARATUS

[75] Inventor: Michael Csanady, Jr., Ridley Park, Pa.

[73] Assignee: Westinghouse Electric Corp., Pittsburgh, Pa.

[21] Appl. No.: 774,725

[22] Filed: Mar., 1977

[51] Int. Cl.² ............................................. F16K 11/02
[52] U.S. Cl. ................................................. 137/625.29
[58] Field of Search ...................... 137/625.29, 625.31; 210/340, 341

[56] References Cited

U.S. PATENT DOCUMENTS

| | | | |
|---|---|---|---|
| 1,721,233 | 7/1929 | Royle | 210/341 |
| 2,447,952 | 8/1948 | MacNeill | 210/341 |
| 3,679,060 | 7/1972 | Smith | 210/340 X |
| 3,757,956 | 9/1973 | Bradel | 210/340 X |

Primary Examiner—Robert G. Nilson
Attorney, Agent, or Firm—J. W. Keen

[57] ABSTRACT

A valving apparatus having an inlet port for providing fluid communication to a plurality of inlet chambers each of which has a fluid transfer port and having a plurality of outlet chambers each of which has a fluid transfer port and is in fluid communication with an outlet port. A first rotatable valve disc disposed on a shaft obstructs selected portions of the inlet port preventing fluid communication therethrough to selected inlet chambers and a second rotatable valve disc affixed to the same shaft is arranged to operate simultaneously with the first valve disc by blocking selected portions of the outlet port preventing fluid communication between the outlet port and the selected outlet chambers situated behind the blocked portions.

7 Claims, 6 Drawing Figures

VALVING APPARATUS

BACKGROUND OF THE INVENTION

This invention relates to delivering fluid to a multitude of fluid utilizing devices and more particularly to a valve which is capable of maintaining a predetermined flow rate therethrough while routing incoming fluid flow to selected utilizing devices, receiving fluid streams returning therefrom, and recombining the returning fluid streams into an outgoing fluid flow.

It is necessary to provide cool lubricating oil to the bearings in a turbine so as to improve the oil's lubricating characteristics and prevent it from reaching its flash point. Normally, steam turbines which are utilized in large central station applications have a dual oil cooler arrangement in which either cooler has sufficient capacity to cool the lubricating oil. While the turbine is operating, only one cooler is normally in use with the second cooler remaining inactive and providing backup capability for the first cooler. If maintenance or repair is required for the first, primary cooler, the second cooler must be brought on line without interrupting lubricating oil flow to the turbine. Interruption of the oil flow to the turbine can cause serious turbine damage and result in expensive turbine-generator forced outages. Valves previously utilized to accomplish the simultaneous primary cooler shutdown and secondary cooler startup were of the three-way type and were expensive, difficult to handle due to their high weight and responsible for high pressure drops in the oil lubrication system.

SUMMARY OF THE INVENTION

In general a valving apparatus when made in accordance with this invention, comprises a housing, a plurality of first group chambers, a plurality of second group chambers, an inlet port and outlet port for the first and second group of chambers respectively, and means for selectively regulating fluid communication through the inlet port to the first group chambers while simultaneously selectively regulating fluid communication between the second group chambers and the outlet port. The simultaneous selective regulation of fluid communication through the inlet and outlet ports is provided by an inlet valve disc and outlet valve disc each having at least one aperture therein with those valve discs being mounted on a rotatable shaft. The inlet valve disc's aperture cooperates with the inlet port and the outlet valve disc's aperture cooperates with the outlet port to selectively provide fluid communication to predetermined inlet and outlet chambers, respectively. A first valve seat is interposed between the inlet port and the inlet valve disc and a second valve seat is interposed between the outlet port and the outlet valve disc with those valve seats being adapted to cooperate with the valve discs to block the flow of fluid through selected portions of the inlet and outlet ports while continuously maintaining a substantially constant flow area through the inlet port and a substantially constant flow area through the outlet port during the selective regulation.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
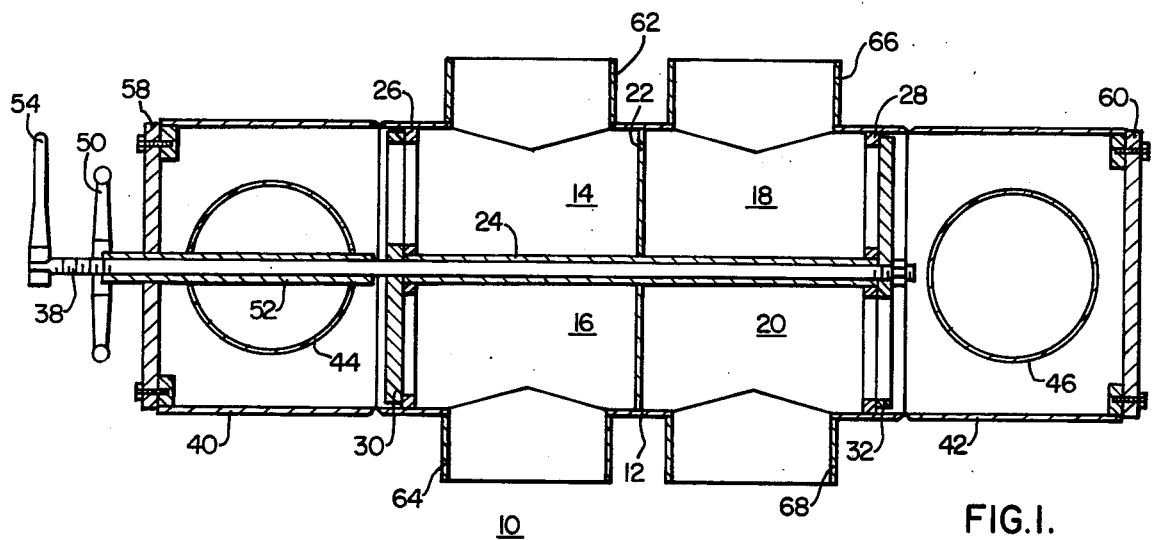
FIG. 1 is a sectional view of a valving apparatus incorporating this invention.
Figure 5:
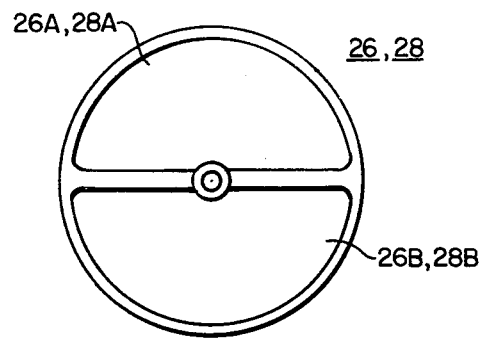
FIG. 5 is an elevation view of a valve seat which mates with one of the valve discs.
Figure 4:
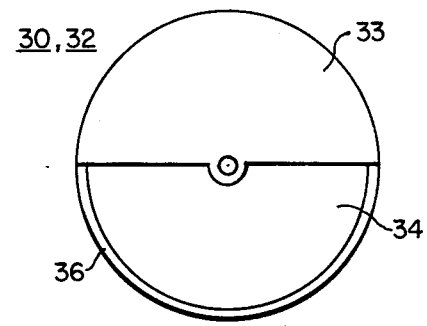
FIG. 4 is an elevation view of one of the valve discs shown in FIG. 2.

Referring now to the drawings in detail, FIG. 1 shows a valve apparatus 10 having a housing 12 which is divided into four chambers 14, 16, 18 and 20 by bulkheads 22 and 24. Valve seats 26 and 28, better illustrated by the single embodiment shown in FIG. 5, are assembled on each axial end of housing 12 and provide seating surfaces for valve discs 30 and 32 which are respectively disposed adjacent thereto. Valve discs 30 and 32 are illustrated by the single embodiment of FIG. 4. As can be seen from FIG. 4, the valve discs are circular with a solid portion 33 of approximately 180 degrees and a hollow portion 34 occupying the remaining circular area with a small rim portion 36 disposed about the periphery of hollow space 34.

Figure 2:
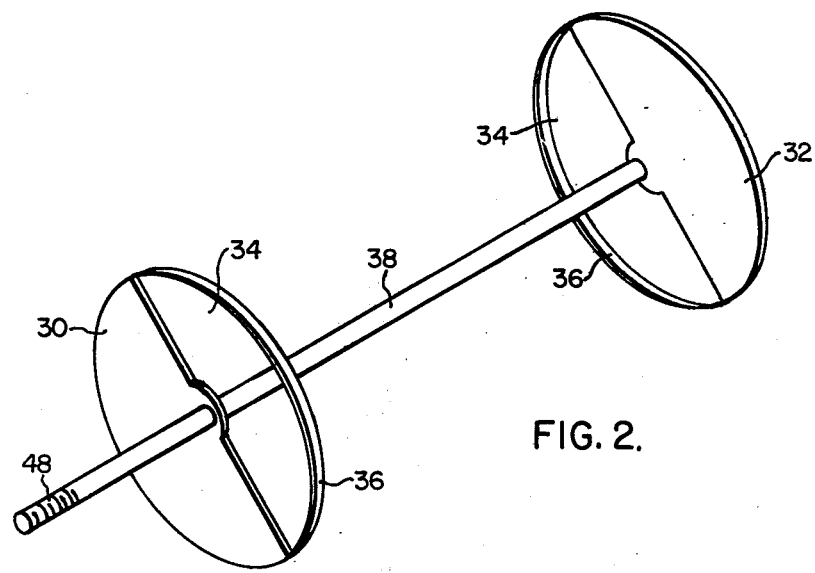
FIG. 2 is a pictorial view of a shaft with valve discs assembled thereon as incorporated in this invention.
Figure 3:
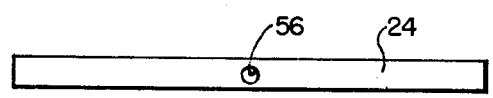
FIG. 3 is an elevation view of a bulkhead which surrounds and houses the shaft illustrated in FIG. 2.

FIG. 2 illustrates how valve discs 30 and 32 are disposed on shaft 38 wherein valve disc 32 is fastened securely with shaft 38 while valve disc 30 is assembled thereto so as to rotate with shaft 38 while being axially displaceable along shaft 38 by the use of a key mechanism for example. Inlet head 40 and outlet head 42 are disposed on axially opposite ends of housing 12 and cooperate therewith by respectively providing an inlet and outlet plenum. An inlet nozzle 44 and an outlet nozzle 46 are respectively disposed on inlet head 40 and outlet head 42 with those nozzles providing a means of ingress to valve 10 and a means of egress from valve 10 for the working fluid directed therethrough. Shaft 38 is threaded on the inlet head end with those threads 48 being better illustrated in FIG. 2. Threaded handwheel 50 is engaged with threads 48 and cooperates with sleeve 52 in seating and unseating valve discs 30 and 32 from valve seats 26 and 28. Sleeve 52 is concentrically disposed about shaft 38 and extends axially between threaded handwheel 50 and valve disc 30. By advancing threaded handwheel 50 toward the unthreaded end of shaft 38, sleeve 52 axially displaces valve disc 30 into seating contact with valve seat 26 while shaft 38 and attached valve disc 32 are axially drawn towards threaded handwheel 50 causing valve disc 32 to firmly seat against valve seat 28. Unseating the valve discs 30 and 32 is accomplished by loosening threaded handwheel 50.

When threaded handwheel 50 has been suitably loosened, shaft 38 and rotatably affixed valve discs 30 and 32 may be rotated to any predetermined angular displacement by operating rotation lever 54. Since valve seats 26 and 28 are fixed to stationary housing 12, valve discs 30 and 32 may be rotated a predetermined angular displacement so that valve disc apertures 34 can cooperate with valve seat openings 26A, 26B, 28A, and 28B in providing selective fluid communication to inlet chambers 14 and 16 and to outlet chambers 18 and 20.

The illustrated valve disc apertures 34 are arranged to provide a substantially constant flow area into the selected inlet chambers and out of the selected outlet chambers during rotation of the valve discs 30 and 32. Maintaining substantially constant flow areas for any predetermined angular displacement of the valve discs is accomplished by causing the aperture 34 on each valve disc, when rotated, to overlap adjacent valve seat openings to an extent equal to the obstructed area of those valve seats which are overlapped by solid portion 33 of each valve disc. Flow area maintenance is an absolute requirement for the illustrated embodiment since interruption of lubricating oil to the turbine bearings during turbine operation while switching to a different oil cooler could result in unfavorable consequences. Thus, during a changeover from one cooler to another, there is a transition period when both coolers are operating and receiving oil.

Shaft 38 extends axially through opening 56 provided in bulkhead 24 which separates inlet chamber 14 from inlet chamber 16 and which also separates outlet chamber 18 from outlet chamber 20. FIG. 1 illustrates bolted end plates 58 and 60 which may be easily removed for inspection of or repair to valve discs 30 or 32 and/or seats 26 and 28. Chambers 14, 16, 18, and 20 are respectively equipped with fluid transfer openings 62, 64, 66, and 68.

Figure 6:
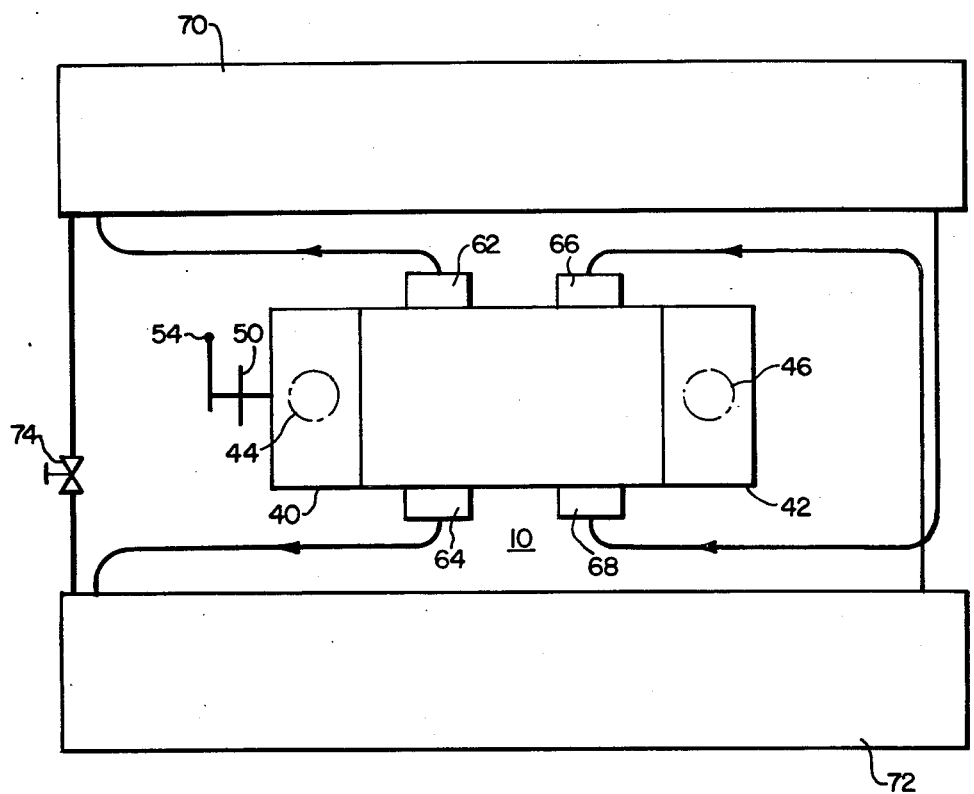
FIG. 6 is a schematic view of this invention and how it is incorporated with two fluid utilizing devices.

FIG. 6 schematically illustrates the flow routes through which a working fluid could be directed by use of the present invention. Lubricating oil returning from turbine bearing drains or other origins may be routed into nozzle 44 and then selectively diverted through inlet chamber 16, or inlet chamber 14, or both and then out transfer opening 62, 64, or both. Transfer opening 62 is in fluid communication with oil cooler 70 or other fluid utilizing device. After the working fluid has been conducted through cooler 70, it is transmitted back to the present invention and enters through transfer opening 68. From there it passes through outlet chamber 20, into outlet head 42, and back to a turbine lubricating oil reservoir (not shown) through outlet nozzle 46. If and when it becomes necessary to remove cooler 70 from service, cooler 72 may be activated by first opening valve 74 to equalize the pressure in cooler 70 and 72. When the pressure has been equalized, threaded handwheel 50 is loosened causing valve disc 30 and valve disc 32 to be simultaneously unseated from valve seats 26 and 28. Operating lever 54 may then be rotated through an arcuate distance of approximately 180° causing aperture 34 in valve disc 30 to become aligned with valve seat opening 26B resulting in open fluid communication between inlet head 40 and inlet chamber 16. Rotation of shaft 38 also causes aperture 34 of valve disc 32 to become aligned with opening 28B of valve seat 28 which results in open fluid communication between outlet chamber 20 and outlet heat 42. After the aforementioned rotation of shaft 38 threaded handwheel 50 is again advanced toward the unthreaded end of shaft 38 causing solid portion 33 of valve disc 30 to be seated against opening 26A of valve seat 26 and simultaneously causing solid portion 33 of valve disc 32 to be seated against and block opening 28A in valve seat 28. Working fluid entering inlet valve 44 is then caused to flow into inlet chamber 16, through transfer opening 64, and into cooler 72. Once cooled, the working fluid returns to outlet chamber 18 via transfer opening 66. From outlet chamber 18 the working fluid passes into outlet head 42 and then returns to the turbine lubricating oil reservoir.

Although valve disc apertures 34 on valve discs 30 and 32 are illustrated as being 180° "out-of-phase", they may be utilized in such manner as to cause them to be "in-phase". In other words, fluid exiting through transfer port 62 and flowing through cooler 70 may be returned to valving apparatus 10 through transfer opening 66 rather than transfer opening 68, as illustrated. It is to be understood that while two inlet chambers are shown in the illustrated embodiment and they are connected with turbine oil lubricating coolers, other numbers of inlet chambers may be utilized to connect the valving apparatus 10 with various fluid utilizing devices. It is also to be pointed out that by rotating shaft 38 through an appropriate angular displacement, both fluid utilizing devices may be put "on-line". Additionally, by suitable formation of apertures 34 in valve discs 30 and 32, the working fluid can be simultaneously routed to a large number of processes which use different amounts of the working fluid.

I claim:

1. A valving apparatus comprising:
 a housing;
 a plurality of discrete chambers within said housing, said chambers including a first and second group each of which comprises at least two of said chambers, each said chamber having a transfer opening;
 an inlet port for providing fluid communication to each chamber in said first group;
 an outlet port for providing fluid communication to each chamber in said second group; and
 means for regulating fluid communication through said inlet and outlet ports to selected chambers in said first and second groups respectively, said regulating means comprising:
 a rotatable shaft extending through said first and second groups of chambers, said shaft having a first end which is threaded and a second end;
 a first valve disc having at least one aperture, said first valve disc being fixedly mounted on the second end of said shaft;
 a second valve disc having at least one aperture, said second valve disc being disposed on said shaft so as to be rotatably fixed to the shaft and axially displaceable on the shaft, said second valve disc being disposed between said threads and said first valve disc;
 a first valve seat interposed between said first valve disc and one of said groups of chambers, said valve seat being disposed in said port which provides fluid communication to that group of chambers, adapted to cooperate with said first valve disc aperture to selectively permit fluid communication to at least one chamber in that group;
 a second valve seat interposed between said second valve disc and the other said group of chambers, said valve seat being disposed in said port which provides fluid communication to said other group of chambers, said valve seat being adapted to cooperate with said second valve disc aperture to selectively permit fluid communication to at least one chamber in said other group;
 means for rotating said shaft;
 a threaded handwheel engaged with said shaft threads in such manner as to seat said valve discs against said valve seats when said threaded handwheel is axially advanced toward said second valve disc and unseats both of said valve discs from said valve seats when said threaded handwheel is axially withdrawn from said second valve disc; and means for precluding fluid communication interruption through said valve disc apertures and said valve seats during rotation of said shaft.

2. The valving apparatus of claim 1, wherein said means for precluding interruption of fluid communication during shaft rotation comprises:
relative disposition of said valve disc apertures and said cooperating valve seats so that there is fluid communication through said apertures and valve seats to at least one chamber in each group for any predetermined rotative position of said shaft.

3. The valving apparatus of claim 1, said rotating means comprising:
a radially extending member fixedly attached to said shaft, said member being capable of rotating said shaft and attached valve discs when said valve discs are unseated.

4. The valving apparatus of claim 1, wherein said first group of chambers is axially adjacent to said second group of chambers along said shaft.

5. The valving apparatus of claim 4, wherein the chambers in each group are circumferentially disposed about said shaft within said housing, said housing having a generally cylindrical shape.

6. The valving apparatus of claim 1, wherein said first and second groups are axially adjacent with said shaft passing axially through at least one bulkhead in each group of chambers in such manner as to be exclusively exposed to the bulkheads.

7. The valving apparatus of claim 1 in combination with a plurality of fluid utilizing devices wherein the transfer opening of each chamber in said first group is in fluid communication with at least one fluid utilizing device, each said fluid utilizing device being in fluid communication with the transfer opening of a chamber in said second group whereby fluid may be selectively diverted through said inlet port to selected first group chambers from which it passes to said utilizing devices and returns to a chamber in said second group from which it passes through said outlet port.

* * * * *